(12) United States Patent
Lan (10) Patent No.: US 7,377,526 B2
(45) Date of Patent: May 27, 2008

(54) WHEEL-MOUNTING ASSEMBLY FOR A STROLLER

(76) Inventor: Red Lan, 15F, No. 108, Sec. 1, Hsin Tai 5th Rd., Hsichih, Taipei Hsien (TW)

( * ) Notice: Subject to any disclaimer, the term of this patent is extended or adjusted under 35 U.S.C. 154(b) by 475 days.

(21) Appl. No.: 11/233,272

(22) Filed: Sep. 22, 2005

(65) Prior Publication Data

US 2007/0063470 A1   Mar. 22, 2007

(51) Int. Cl.
*B62B 7/04* (2006.01)
*B60B 33/02* (2006.01)

(52) U.S. Cl. .................. 280/47.38; 280/642; 16/18 R; 16/35 R (58) Field of Classification Search .......... 280/33.991, 280/642, 647, 650, 47.38; 16/18 R, 29, 45, 16/35 R
See application file for complete search history.

(56) References Cited

U.S. PATENT DOCUMENTS

| | | | |
|---|---|---|---|
| 632,671 A | 9/1899 | Burghardt et al. | |
| 1,190,398 A | 7/1916 | Gates | |
| 1,190,399 A | 7/1916 | Gates | |
| 1,208,109 A | 12/1916 | Deckor | |
| 1,407,235 A | 2/1922 | Taylor | |
| 2,745,673 A | 5/1956 | Koepke et al. | |
| 2,767,996 A | 10/1956 | Seyforth | |
| 4,448,434 A | 5/1984 | Anderson | |
| 4,570,956 A | 2/1986 | Dyer | |
| 4,731,899 A * | 3/1988 | Huang | 16/35 R |
| 4,759,098 A * | 7/1988 | Ko | 16/29 |
| 4,969,230 A * | 11/1990 | Huang | 16/30 |
| 5,014,391 A * | 5/1991 | Schulte | 16/35 R |
| 5,149,115 A | 9/1992 | Sampedro | |
| 5,172,451 A * | 12/1992 | Chiu | 16/35 R |
| 5,403,022 A | 4/1995 | Snider | |
| 5,669,624 A * | 9/1997 | Eichhorn | 280/642 |
| 5,975,545 A * | 11/1999 | Hu | 280/47.38 |
| 6,086,310 A | 7/2000 | Lujan, III et al. | |
| 6,367,821 B2 | 4/2002 | Thiele | |
| 6,557,870 B2 * | 5/2003 | Cheng | 280/47.38 |
| 6,671,926 B2 * | 1/2004 | Huang | 16/35 R |
| 6,871,380 B2 * | 3/2005 | Chen | 16/35 R |
| 6,880,202 B2 * | 4/2005 | Thompson et al. | 16/35 R |
| 7,021,651 B2 * | 4/2006 | Lan | 280/642 |
| 7,210,690 B2 * | 5/2007 | Tan | 280/47.38 |
| 7,258,353 B2 * | 8/2007 | Liao | 280/47.38 |
| 2004/0075229 A1 | 4/2004 | Huntley | |

OTHER PUBLICATIONS

U.S. Appl. No. 11/235,466, filed Sep. 26, 2005, entitled "Foldable Stroller" by Red Lan, 20 pages.

* cited by examiner

*Primary Examiner*—Christopher Bottorff
(74) *Attorney, Agent, or Firm*—Ladas & Parry LLP (57) ABSTRACT

A wheel-mounting assembly includes: a pivot shaft; a frame-connecting part; a wheel-mounting part pivoted to the frame-connecting part through the pivot shaft and formed with a retaining hole; a limiting member mounted movably on the frame-connecting part and extendable into the retaining hole; an urging member for urging the limiting member to move toward the retaining hole; a controlling member pivoted to and rotatable relative to the frame-connecting part between a retaining position to retain the limiting member, and a releasing position to free the limiting member therefrom; and a locking member pivoted to and rotatable relative to the controlling member between a locking position to retain the controlling member at the retaining position, and an unlocking position to release the controlling member therefrom.

7 Claims, 7 Drawing Sheets

WHEEL-MOUNTING ASSEMBLY FOR A STROLLER

BACKGROUND OF THE INVENTION

1. Field of the Invention

The present invention relates to a wheel-mounting assembly, more particularly to a wheel-mounting assembly with a wheel controlling mechanism for controlling orientation of wheels of a stroller.

2. Description of the Related Art

Figure 1:
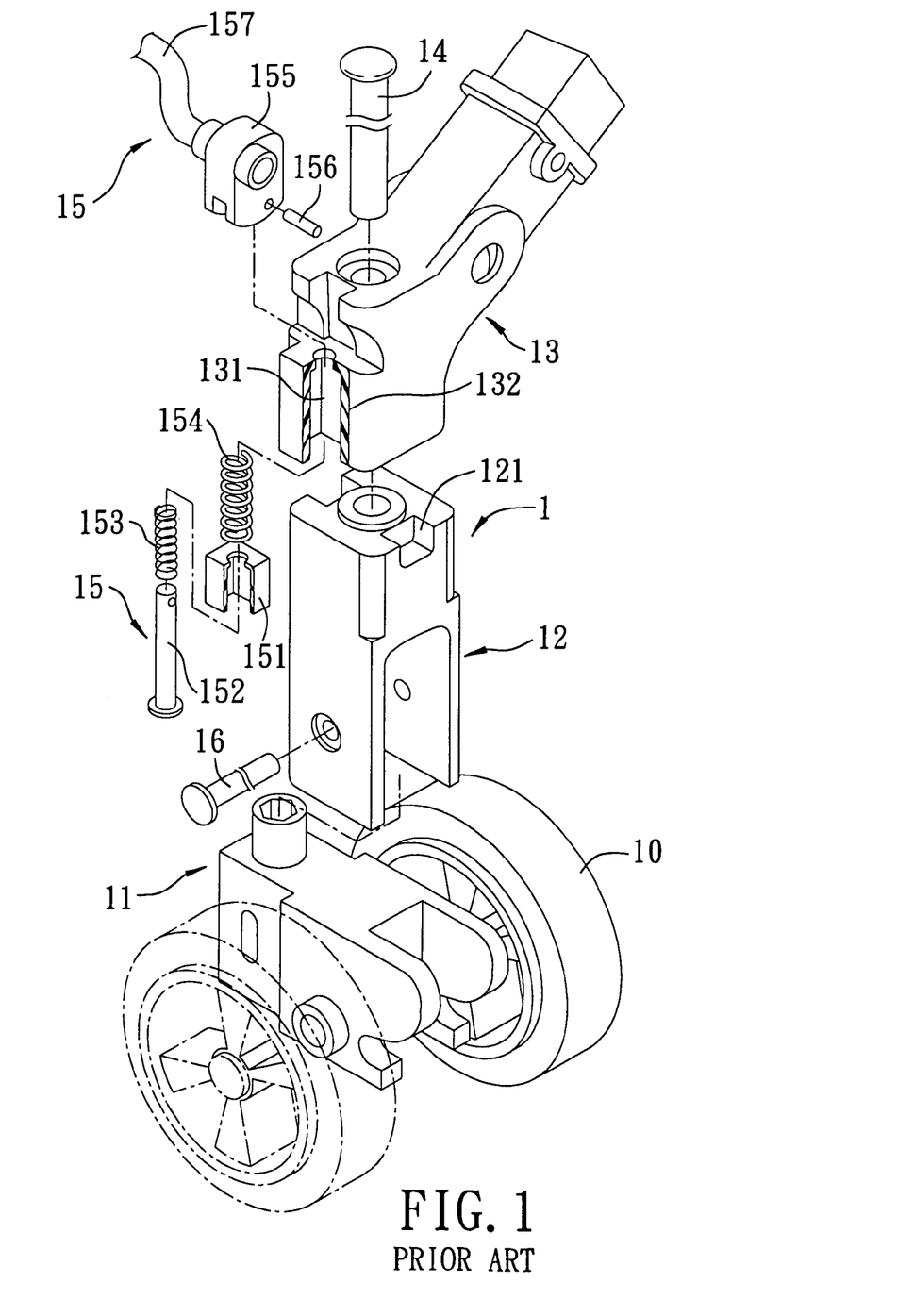
FIG. 1 is a fragmentary exploded perspective view of a conventional wheel-mounting assembly.
Figure 2:
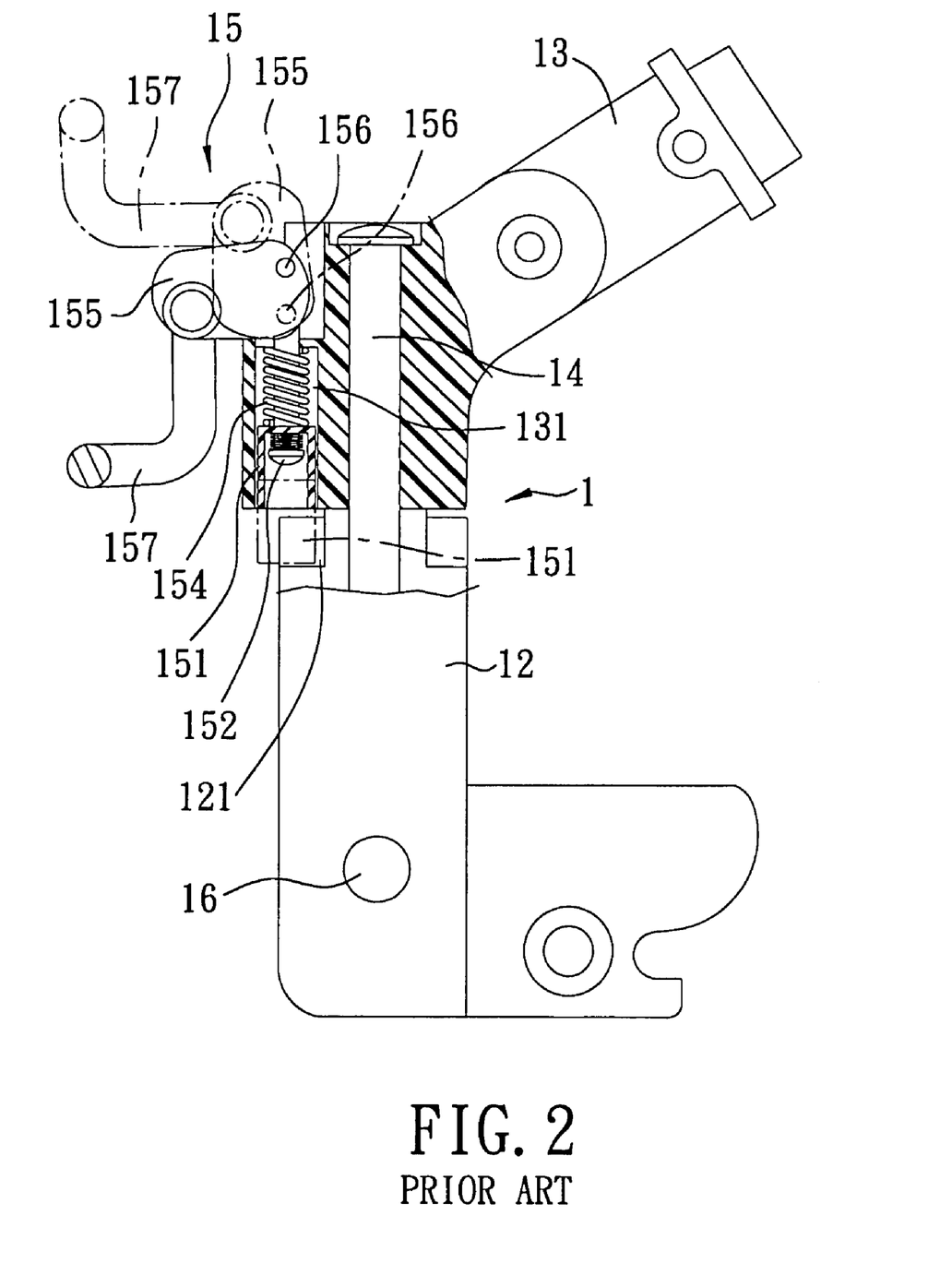
FIG. 2 is a partly sectional view of the conventional wheel-mounting assembly.

In the prior art, front wheels for a stroller are provided to guide moving direction of the stroller. FIGS. 1 and 2 illustrate a conventional stroller having a wheel-mounting assembly 1 mounted on the stroller frame thereof. The wheel-mounting assembly 1 includes: a wheel seat 11 adapted for mounting wheels 10 thereon; a wheel-mounting part 12 mounted on a top end of the wheel seat 11; a frame connecting part 13 coupled to the stroller frame (not shown) and pivoted to the wheel-mounting part 12; a pivot shaft 14 extending through the wheel-mounting part 12 and the frame connecting part 13 for pivot connection therebetween; a coupling pin 16 extending through the wheel seat 11 and the wheel-mounting part 12; and a positioning mechanism 15 mounted on the frame connecting part 13. The wheel-mounting part 12 has an upper front edge formed with a positioning notch 121. The frame connecting part 13 has a bottom side formed with a receiving chamber 131 defined by a chamber-defining wall 132. The positioning mechanism 15 includes a hollow engaging block 151 movably received in the receiving chamber 131, a tumbler 152 extending through the engaging block 151, a first spring 153 sleeved on the tumbler 152 and disposed in the engaging block 151, a second spring 154 disposed above the engaging block 151 and sleeved on an upper end portion of the tumbler 152, a control member 155 mounted rotatably on the frame connecting part 13 and disposed above the second spring 154, a locking pin 156 connecting an upper end of the tumbler 152 to a bottom end of the control member 155, and a lever 157 for driving movement of the engaging block 151 through the control member 155 and the second spring 154.

The wheels 10 can be operated through the positioning mechanism 15 between a free state, in which the wheels 10 together with the wheel seat 11 and the wheel mounting part 12 are free to rotate relative to the frame connecting part 13 as shown by the solid lines in FIG. 2, and a limited state, in which the wheels 10 together with the wheel seat 11 and the wheel mounting part 12 are locked against rotation relative to the frame connecting part 13 as shown by the imaginary lines in FIG. 2. To dispose the wheels 10 at the free state, the lever 157 is operated to move downward so as to displace the locking pin 156 to an upper position such that the engaging block 151 is retracted into the receiving chamber 131, thereby permitting the wheels 10 to rotate freely. To dispose the wheels 10 at the limited state, the lever 157 is operated to move upward so as to displace downward the locking pin 156 to a lower position, which results in downward movement of the second spring 154, which, in turn, moves the engaging block 151 into the positioning notch 121, thereby limiting the wheels 10 against rotation relative to the frame connecting part 13.

The wheel-mounting assembly 1 is disadvantageous in that assembly of the engaging block 151, the first and second springs 153, 154, the locking pin 156, and the control member 155 is laborious, and that mounting of the assembly of the engaging block 151, the first and second springs 153, 154, and the locking pin 156 in the receiving chamber 131 in the frame connecting part 13 is relatively inconvenient.

SUMMARY OF THE INVENTION

Therefore, the object of the present invention is to provide a wheel-mounting assembly that can overcome the aforesaid drawbacks associated with the prior art.

According to this invention, there is provided a wheel-mounting assembly that comprises: a pivot shaft; a frame-connecting part; a wheel-mounting part pivoted to the frame-connecting part through the pivot shaft and formed with a retaining hole; a limiting member mounted movably on the frame-connecting part and aligned with the retaining hole when the frame-connecting part rotates relative to the wheel-mounting part about the pivot shaft to a predetermined position, the limiting member being movable relative to the frame-connecting part and the wheel-mounting part between a limiting position, in which the limiting member extends into and engages the retaining hole, and a non-limiting position, in which the limiting member is disposed outwardly of and is disengaged from the retaining hole; an urging member for urging the limiting member to move from the non-limiting position to the limiting position; a controlling member pivoted to the frame-connecting part and rotatable relative to the frame-connecting part between a retaining position, in which the limiting member is retained at the non-limiting position by the controlling member, and a releasing position, in which the limiting member is released from being retained by the controlling member so as to be movable from the non-limiting position to the limiting position through urging action of the urging member; and a locking member pivoted to the controlling member and rotatable relative to the controlling member between a locking position, in which the locking member engages the frame-connecting part so as to retain the controlling member at the retaining position, and an unlocking position, in which the locking member is disengaged from the frame-connecting part so as to permit movement of the controlling member from the retaining position to the releasing position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
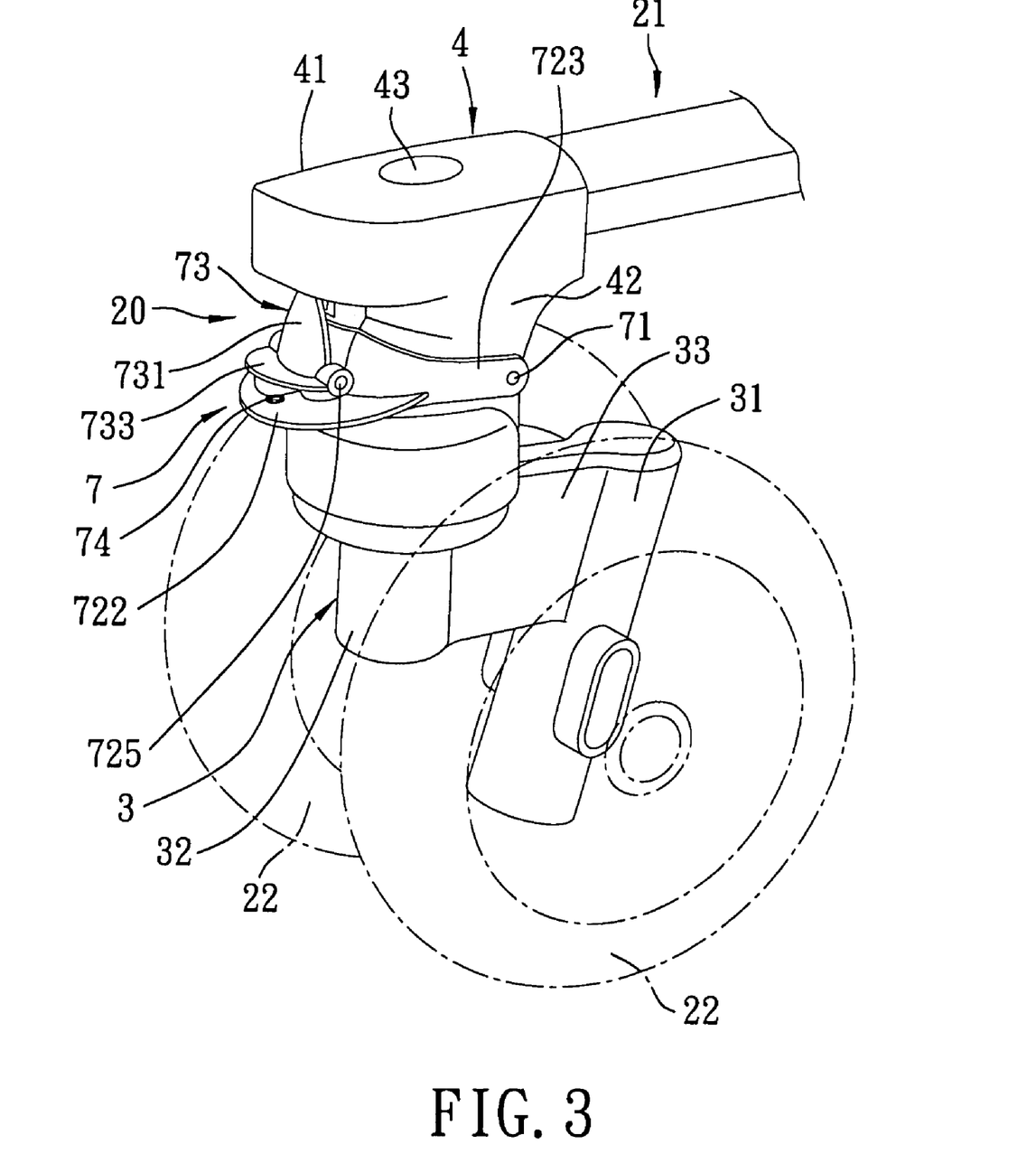
FIG. 3 is a fragmentary perspective view of the preferred embodiment of a wheel-mounting assembly according to the present invention.
Figure 4:
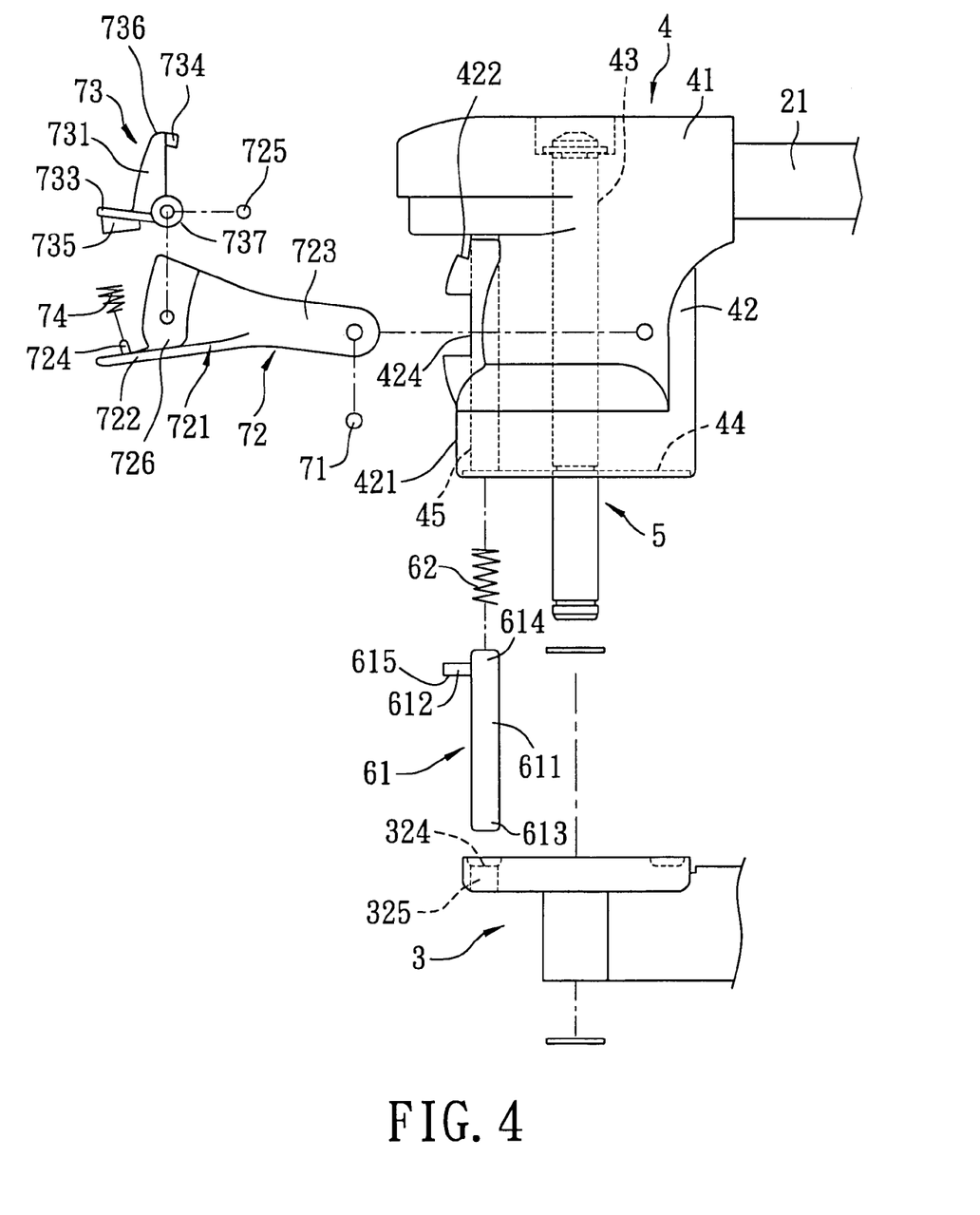
FIG. 4 is an exploded schematic view of the preferred embodiment.

Referring to FIGS. 3 and 4, the preferred embodiment of a wheel-mounting assembly 20 according to the present invention is shown to be adapted to be mounted on a bottom of a frame 21 of a stroller and adapted for mounting a pair of wheels 22 thereon. The wheel-mounting assembly 20 includes: a frame-connecting part 4; a wheel-mounting part 3 pivoted to the frame-connecting part 4 through a pivot shaft 5 and formed with a retaining hole 325; a limiting member 61 mounted movably on the frame-connecting part 4 and aligned with the retaining hole 325 when the frame-connecting part 4 rotates relative to the wheel-mounting part 3 about the pivot shaft 5 to a predetermined position, the limiting member 61 being movable relative to the frame-connecting part 4 and the wheel-mounting part 3 between a limiting position (see FIG. 7), in which the limiting member 61 extends into and engages the retaining hole 325, and a non-limiting position (see FIG. 6), in which the limiting member 61 is disposed outwardly of and is disengaged from the retaining hole 325; an urging member 62 for urging the limiting member 61 to move from the non-limiting position to the limiting position; a controlling member 72 pivoted to the frame-connecting part 4 and rotatable relative to the frame-connecting part 4 between a retaining position (see FIG. 6), in which the limiting member 61 is retained at the non-limiting position by the controlling member 72, and a releasing position (see FIG. 7), in which the limiting member 61 is released from being retained by the controlling member 72 so as to be movable from the non-limiting position to the limiting position through urging action of the urging member 62; and a locking member 73 pivoted to the controlling member 72 and rotatable relative to the controlling member 72 between a locking position (see FIG. 6), in which the locking member 73 engages the frame-connecting part 4 so as to retain the controlling member 72 at the retaining position, and an unlocking position (see FIG. 7), in which the locking member 73 is disengaged from the frame-connecting part 4 so as to permit movement of the controlling member 72 from the retaining position to the releasing position.

Referring again to FIG. 4, the limiting member 61 includes a limiting rod 611 that extends in a first direction parallel to the pivot shaft 5, that is movable in the first direction, and that has a first end 613 which extends into the retaining hole 325 when the limiting member 61 is disposed at the limiting position, and a second end 614 which is opposite to the first end 613. The limiting member 61 further includes a protrusion 612 that extends transversely from the second end 614 of the limiting rod 611 and that contacts the controlling member 72 so as to drive rotation of the controlling member 72 from the retaining position to the releasing position when the limiting member 61 is moved from the non-limiting position to the limiting position, and so as to be driven by the controlling member 72 for moving the limiting member 61 from the limiting position to the non-limiting position when the controlling member 72 is moved from the releasing position to the retaining position by an external force.

The frame-connecting part 4 includes a frame coupling portion 41 adapted for coupling with the frame 21, and a wheel coupling portion 42 extending from the frame coupling portion 41 for coupling with the wheel-mounting part 3. The wheel coupling portion 42 of the frame-connecting part 4 has a front part 421 formed with an elongated rod-receiving hole 45 for receiving the limiting rod 611 therein, and a radial through-hole 424 in spatial communication with the rod-receiving hole 45 such that the protrusion 612 extends outwardly therethrough and has a contacting portion 615 that is disposed at an exterior of the front part 421 of the wheel coupling portion for contacting the controlling member 72.

The controlling member 72 includes a first pivot pin 71 extending in a transverse direction relative to the pivot shaft 5, an operating lever 721 that has a first end 723 pivoted to the frame-connecting part 4 through the first pivot pin 71, and a second end 726 that is opposite to the first end 723 of the operating lever 721, and a second pivot pin 725 mounted on the second end 726 of the operating lever 721 and extending in the transverse direction. The contacting portion 615 of the protrusion 612 of the limiting member 61 is disposed above and contacts the second pivot pin 725 after assembly.

Moreover, the front part 421 of the wheel coupling portion 4 is formed with a shoulder 422 disposed adjacent to the locking member 73. The locking member 73 includes an arm 731 that has a first end 737 pivoted to the second end 726 of the operating lever 721 through the second pivot pin 725, and a second end 736 opposite to the first end 737 of the arm 731, and a neck 734 protruding from the second end 736 of the arm 731 and engaging releasably the shoulder 422 when the locking member 73 is disposed at the locking position. The locking member 73 further includes a spring-mounting plate 733 that extends from the first end 737 of the arm 731 in a direction opposite to the neck 734 and that is provided with a spring-retaining ring 735. The controlling member 72 further includes a spring-abutting plate 722 that extends from the second end 726 of the operating lever 721, and that is provided with a retaining stud 724 protruding upwardly therefrom. The wheel-mounting assembly 20 further includes a biasing member 74 that is sleeved on the retaining stud 724, that extends into the spring-retaining ring 735, and that is disposed between and that abuts against the spring-mounting plate 733 and the spring-abutting plate 722 so as to urge the locking member 73 to move from the unlocking position to the locking position.

Figure 5:
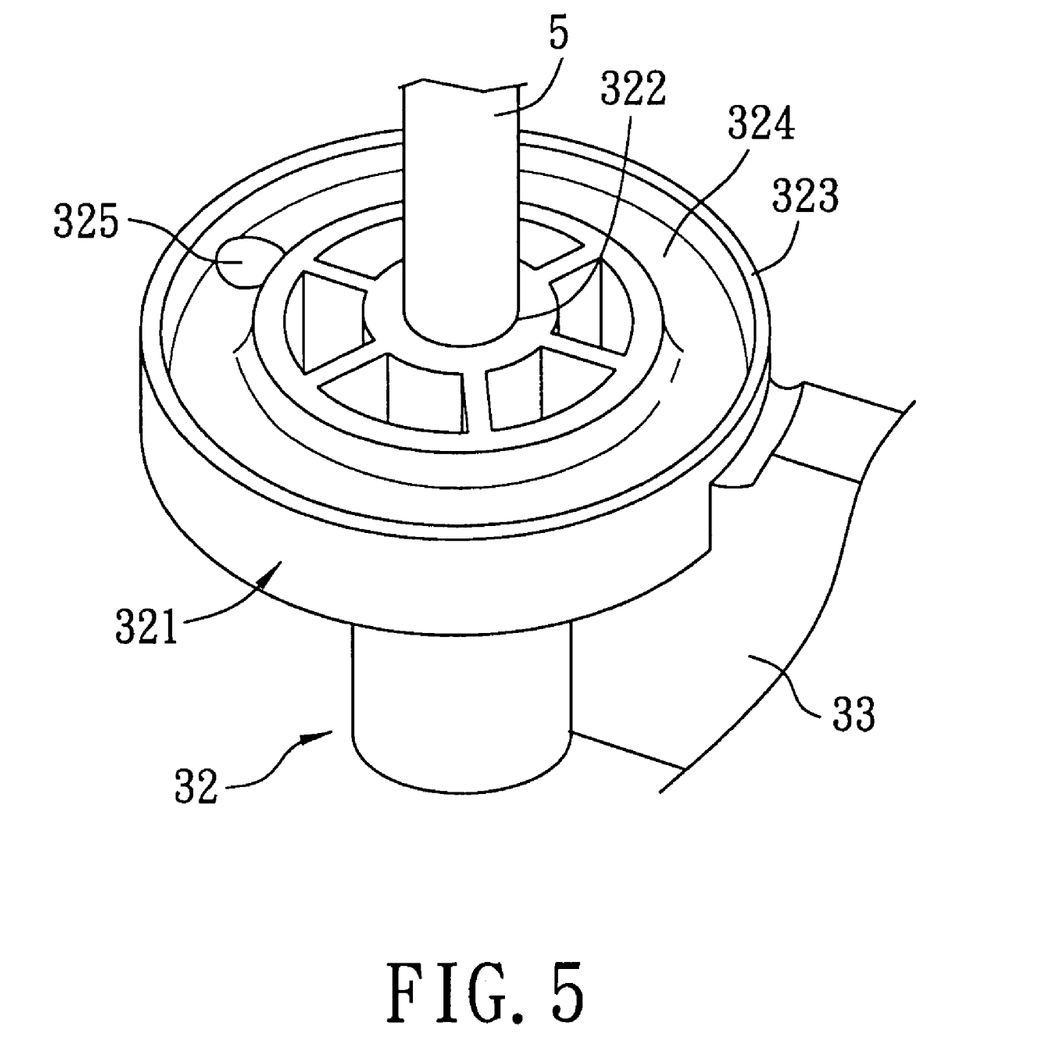
FIG. 5 is a fragmentary perspective view of an upper connecting element of a wheel-mounting part of the preferred embodiment.

Referring again to FIG. 3, the wheel-mounting part 3 includes a wheel mounting element 31 adapted for mounting the wheels 22 thereon, an upper connecting element 32, and a bridging element 33 interconnecting the wheel mounting element 31 and the upper connecting element 32. Referring to FIG. 5, the upper connecting element 32 has a disc portion 321 that is formed with the retaining hole 325 and that is further formed with an annular groove 324 coaxially surrounding the pivot shaft 5, and a rim portion 323 that extends from a periphery of the disc portion 321. The frame-connecting part 4 is formed with a recess 44 (see FIG. 4) for receiving the rim portion 323 therein. The retaining hole 325 extends inwardly of the disc portion 321 from the annular groove 324 such that when the first end 613 of the limiting rod 611 extends into the annular groove 324 by the urging action of the urging member 62 upon release of the limiting member 61 from being retained by the controlling member 72, the first end 613 of the limiting rod 611 can slide along the annular groove 324 to a position registered with the retaining hole 325 so as to be able to extend into the retaining hole 325. The upper connecting element 32 is further formed with a pivot hole 322 for extension of the pivot shaft 5 therethrough.

Figure 6:
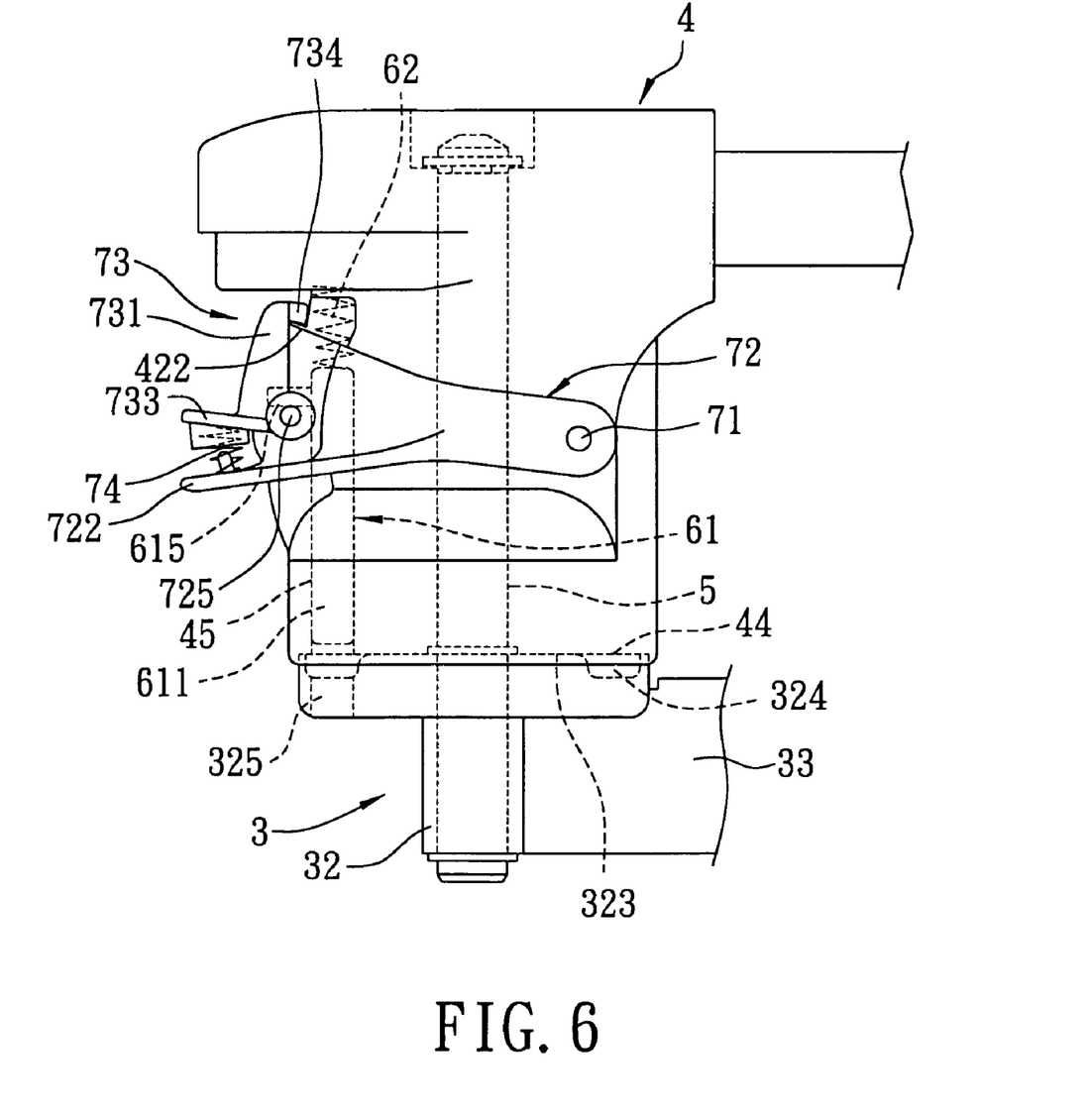
FIG. 6 is a fragmentary schematic view illustrating a state where a limiting member of the preferred embodiment is disposed at a non-limiting position.
Figure 7:
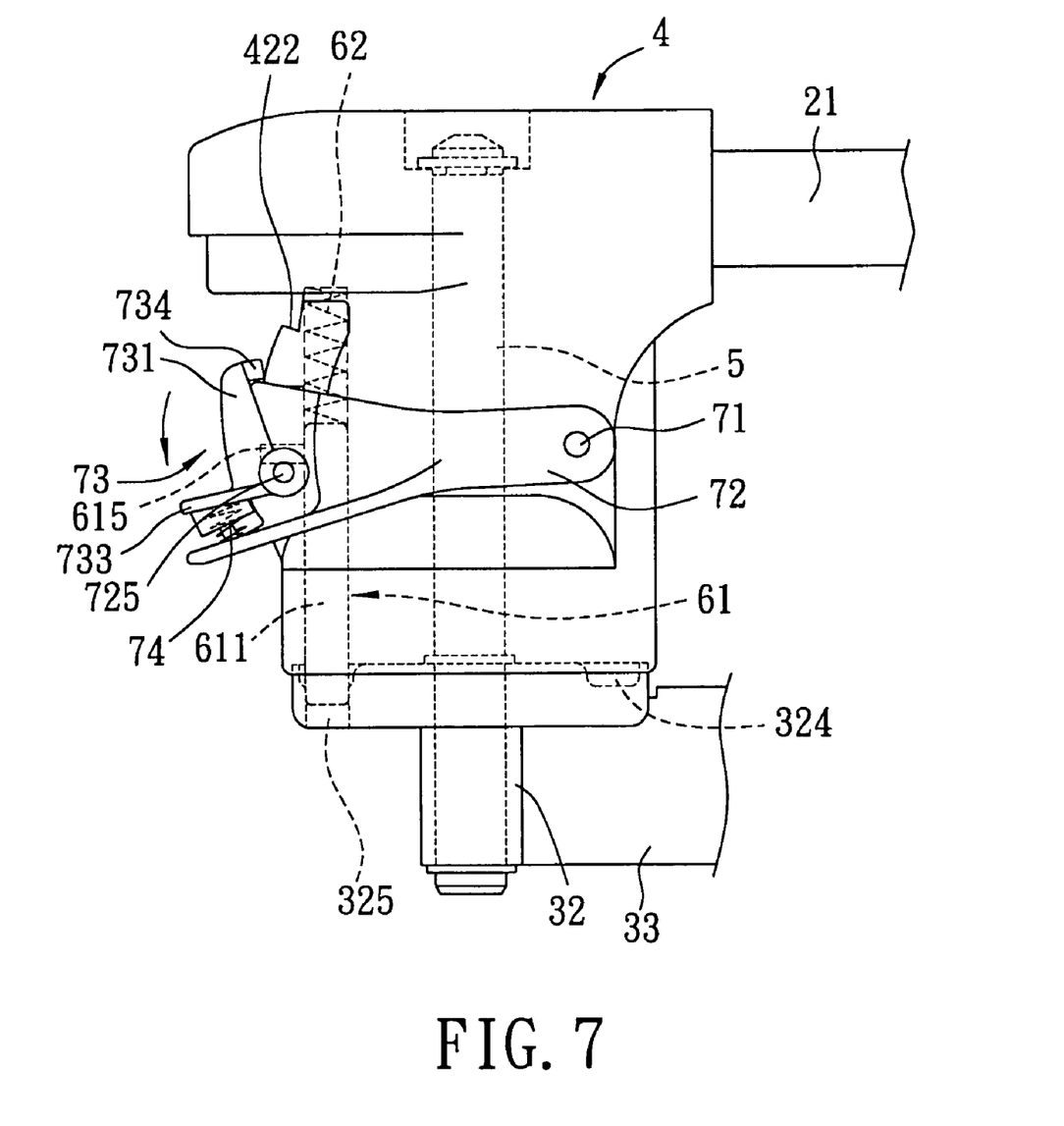
FIG. 7 is a fragmentary schematic view illustrating a state where the limiting member of the preferred embodiment is disposed at a limiting position.

During assembly, referring to FIGS. 5, 6 and 7, the biasing member 74 is disposed between the spring-mounting plate 733 and the spring-abutting plate 722. The locking member 73 is then pivotally mounted on the controlling member 72 through the second pivot pin 725. The urging member 62 and the limiting rod 611 are then inserted into the rod-receiving hole 45 of the frame-connecting part 4. The rim portion 323 of the wheel-mounting part 3 is subsequently mounted in the recess 44 of the frame-connecting part 4 for engagement between the frame-connecting part 4 and the wheel-mounting part 3 with the pivot shaft 5 extending though the frame-connecting part 4 and into the wheel-mounting part 3. The assembly of the locking member 73 and the controlling member 72 is then pivotally mounted on the frame-connecting part 4 through the first pivot pin 71.

When the wheel-mounting assembly 20 is disposed at a wheel free-rotation state as shown in FIG. 6, the neck 734 of the locking member 73 engages the shoulder 422 of the frame-connecting part 4, and the first end 613 of the limiting rod 611 is fully retracted into the rod-receiving hole 45. To move the wheel-mounting assembly 20 from the wheel free-rotation state to a wheel locking state, the locking member 73 is depressed, for instance, by a foot, against the biasing force of the biasing member 74 so as to pivot about the second pivot pin 725 for disengaging the neck 734 of the locking member 73 from the shoulder 422 of the frame-connecting part 4. Thereafter, the limiting member 61 is urged by the urging member 62 to move downward, which results in rotation of the controlling member 72 about the first pivot pin 71, and movement of the first end 613 of the limiting rod 611 into the annular groove 324. Then, if the first end 613 of the limiting rod 611 is yet to be registered with the retaining hole 325, the frame-connecting part 4 can be operated to rotate relative to the wheel-mounting part 3 such that the first end 613 of the limiting rod 611 is slid along the annular groove 324 to the position registered with the retaining hole 325 so as to permit extension of the limiting rod 611 into the retaining hole 325 for disposing the limiting member 61 in the limiting position, as shown in FIG. 7.

In a similar manner, to move the wheel-mounting assembly 20 from the wheel locking state to the wheel free-rotation state, the controlling member 72 is uplifted, for instance, by a foot, the biasing member 74 provides an urging force to rotate the locking member 73 toward the shoulder 422, and the controlling member 72 is pivoted upwardly about the second pivot pin 725 so as to move the limiting member 61 upwardly and accordingly against the urging force of the urging member 62. When the neck 734 of the locking member 73 is moved to a level higher than the shoulder 422 of the frame-connecting part 4, due to the biasing force of the biasing member 74, the neck 734 is able to engage the shoulder 422. Thereafter, the first end 613 of the limiting rod 611 is entirely retracted into the rod-receiving hole 45 and, the wheel-mounting assembly 20 is thus disposed at the wheel free-rotation state.

Since only the limiting member 61 and the urging member 62 are required to be mounted in the rod-receiving hole 45, the aforesaid inconvenience associated with assembly of the prior art can be abated. Moreover, operation of the controlling member 72 for controlling the operation states of the wheel-mounting assembly 20 is smoother than that of the aforesaid conventional wheel-mounting assembly described hereinabove.

While the present invention has been described in connection with what is considered the most practical and preferred embodiment, it is understood that this invention is not limited to the disclosed embodiment but is intended to cover various arrangement included within the spirit and scope of the broadest interpretation so as to encompass all such modifications and equivalent arrangements.

What is claimed is:

1. A wheel-mounting assembly comprising:
   a pivot shaft;
   a frame-connecting part;
   a wheel-mounting part pivoted to said frame-connecting part through said pivot shaft and formed with a retaining hole;
   a limiting member mounted movably on said frame-connecting part and aligned with said retaining hole when said frame-connecting part rotates relative to said wheel-mounting part about said pivot shaft to a predetermined position, said limiting member being movable relative to said frame-connecting part and said wheel-mounting part between a limiting position, in which said limiting member extends into and engages said retaining hole, and a non-limiting position, in which said limiting member is disposed outwardly of and is disengaged from said retaining hole;
   an urging member for urging said limiting member to move from the non-limiting position to the limiting position;
   a controlling member pivoted to said frame-connecting part and rotatable relative to said frame-connecting part between a retaining position, in which said limiting member is retained at the non-limiting position by said controlling member, and a releasing position, in which said limiting member is released from being retained by said controlling member so as to be movable from the non-limiting position to the limiting position through urging action of said urging member; and
   a locking member pivoted to said controlling member and rotatable relative to said controlling member between a locking position, in which said locking member engages said frame-connecting part so as to retain said controlling member at the retaining position, and an unlocking position, in which said locking member is disengaged from said frame-connecting part so as to permit movement of said controlling member from the retaining position to the releasing position.

2. The wheel-mounting assembly as claimed in claim 1, wherein said limiting member includes a limiting rod that extends in a first direction parallel to said pivot shaft, that is movable in said first direction, and that has a first end which extends into said retaining hole when said limiting member is disposed at the limiting position, and a second end which is opposite to said first end, said limiting member further including a protrusion that extends transversely from said second end of said limiting rod and that contacts said controlling member so as to drive rotation of said controlling member from the retaining position to the releasing position when said limiting member is moved from the non-limiting position to the limiting position and so as to be driven by said controlling member for moving said limiting member from the limiting position to the non-limiting position when said controlling member is moved from the releasing position to the retaining position.

3. The wheel-mounting assembly as claimed in claim 2, wherein said frame-connecting part is formed with an elongated rod-receiving hole for receiving said limiting rod therein, said protrusion extending outwardly of said rod-receiving hole and having a contacting portion that is disposed at an exterior of said frame-connecting part for contacting said controlling member.

4. The wheel-mounting assembly as claimed in claim 3, wherein said controlling member includes a first pivot pin extending in a transverse direction relative to said pivot shaft, an operating lever that has a first end pivoted to said frame-connecting part through said first pivot pin, and a second end that is opposite to said first end of said operating lever, and a second pivot pin mounted on said second end of said operating lever and extending in said transverse direction, said contacting portion of said protrusion of said limiting member being disposed above and contacting said second pivot pin.

5. The wheel-mounting assembly as claimed in claim 4, wherein said frame-connecting part is formed with a shoulder disposed adjacent to said locking member, said locking member including an arm that has a first end pivoted to said second end of said operating lever through said second pivot pin, and a second end opposite to said first end of said arm, and a neck protruding from said second end of said arm and engaging releasably said shoulder when said locking member is disposed at the locking position.

6. The wheel-mounting assembly as claimed in claim 5, wherein said locking member further includes a spring-mounting plate that extends from said first end of said arm in a direction opposite to said neck, said controlling member further including a spring-abutting plate that extends from said second end of said operating lever, said wheel-mounting assembly further comprising a biasing member that is disposed between and that abuts against said spring-mounting plate and said spring-abutting plate so as to urge said locking member to move from the unlocking position to the locking position.

7. The wheel-mounting assembly as claimed in claim 6, wherein said wheel-mounting part includes an upper connecting element having a disc portion that is formed with said retaining hole and that is further formed with an annular groove coaxially surrounding said pivot shaft, and a rim portion that extends from a periphery of said disc portion, said frame-connecting part being formed with a recess for receiving said rim portion therein, said retaining hole extending inwardly of said disc portion from said annular groove such that when said first end of said limiting rod extends into said annular groove by the urging action of said urging member upon release of said limiting member from being retained by said controlling member, said first end of said limiting rod can slide along said annular groove to a position registered with said retaining hole so as to be able to extend into said retaining hole.

\* \* \* \* \*